(12) United States Patent
Caruel et al.

(10) Patent No.: US 10,125,683 B2
(45) Date of Patent: Nov. 13, 2018

(54) DE-ICING AND CONDITIONING DEVICE FOR AN AIRCRAFT

(71) Applicant: AIRCELLE, Gonfreville L'Orcher (FR)

(72) Inventors: Pierre Caruel, Le Havre (FR); Hervé Hurlin, Igny (FR)

(73) Assignee: AIRCELLE, Gonfreville L'Orcher (FR)

( * ) Notice: Subject to any disclaimer, the term of this patent is extended or adjusted under 35 U.S.C. 154(b) by 382 days.

(21) Appl. No.: 14/974,427

(22) Filed: Dec. 18, 2015

(65) Prior Publication Data

US 2016/0102610 A1 Apr. 14, 2016

Related U.S. Application Data

(63) Continuation of application No. PCT/FR2014/051650, filed on Jun. 27, 2014.

(30) Foreign Application Priority Data

Jun. 28, 2013 (FR) ..................................... 13 56304

(51) Int. Cl.
*F02C 7/047* (2006.01)
*B64D 15/04* (2006.01)
*B64D 33/02* (2006.01)

(52) U.S. Cl.
CPC .............. *F02C 7/047* (2013.01); *B64D 15/04* (2013.01); *B64D 33/02* (2013.01); *B64D 2033/0233* (2013.01); *Y02T 50/672* (2013.01)

(58) Field of Classification Search
CPC .. F02C 7/047; B64D 15/04; B64D 2033/0233
See application file for complete search history.

(56) References Cited

U.S. PATENT DOCUMENTS

| 3,981,466 | A | * | 9/1976 | Shah | ...................... B64D 15/02 |
| | | | | | 165/42 |
| 4,773,212 | A | * | 9/1988 | Griffin | .................... F02C 7/224 |
| | | | | | 60/226.1 |
| 4,782,658 | A | | 11/1988 | Perry | |
| 5,143,329 | A | * | 9/1992 | Coffinberry | ............. F02C 7/277 |
| | | | | | 244/118.5 |

(Continued)

FOREIGN PATENT DOCUMENTS

DE 10 2010 054448 A1 6/2012
EP 1 103 462 A1 5/2001
(Continued)

OTHER PUBLICATIONS

International Search Report dated Sep. 29, 2014 in International Application No. PCT/FR2014/051650.

*Primary Examiner* — Christopher P Ellis
(74) *Attorney, Agent, or Firm* — Burris Law, PLLC

(57) ABSTRACT

The present disclosure provides a device for de-icing an air inlet lip of an aircraft nacelle. The device includes a pre-exchanger, an intake orifice of taking in low-pressure air downstream from a fan, and two high-pressure air intake orifices downstream from a compressor in addition to controlled valves and check valves installed in an air flow network. In particular, the pre-exchanger includes a low-pressure air outlet capable of opening into the air inlet lip of the aircraft nacelle via a pipe of the air flow network.

9 Claims, 1 Drawing Sheet

(56) References Cited

U.S. PATENT DOCUMENTS

| | | | |
|---|---|---|---|
| 2005/0150204 A1* | 7/2005 | Stretton | F02C 7/047 60/39.83 |
| 2007/0034351 A1* | 2/2007 | Marche | B64D 13/00 165/41 |
| 2013/0175001 A1* | 7/2013 | Cheong | F02C 7/185 165/41 |
| 2013/0195658 A1* | 8/2013 | Saito | B64D 15/04 416/39 |
| 2013/0283816 A1* | 10/2013 | Smith | B64C 39/024 60/784 |
| 2014/0000279 A1* | 1/2014 | Brousseau | B64D 13/08 60/782 |
| 2014/0205446 A1* | 7/2014 | Patsouris | F02C 7/047 415/175 |
| 2014/0250898 A1* | 9/2014 | Mackin | F02C 6/08 60/772 |
| 2014/0369812 A1* | 12/2014 | Caruel | F02K 3/06 415/116 |
| 2015/0034767 A1* | 2/2015 | Pirat | B64D 15/04 244/134 B |
| 2015/0291284 A1* | 10/2015 | Victor | B64D 15/04 244/134 B |
| 2016/0061056 A1* | 3/2016 | Appukuttan | F01D 25/10 415/144 |
| 2016/0160758 A1* | 6/2016 | Marchaj | F02C 7/047 60/779 |
| 2016/0245152 A1* | 8/2016 | Thomassin | F02B 33/40 |
| 2016/0245174 A1* | 8/2016 | Lamarre | F02B 33/40 |
| 2016/0257413 A1* | 9/2016 | Newman | F02C 7/047 |
| 2017/0030265 A1* | 2/2017 | O'Toole | F02C 7/047 |
| 2017/0074167 A1* | 3/2017 | Alstad | F02K 3/115 |
| 2017/0167382 A1* | 6/2017 | Miller | B64D 15/06 |
| 2017/0184030 A1* | 6/2017 | Brousseau | F02C 7/14 |
| 2017/0248077 A9* | 8/2017 | Tateiwa | F02C 7/143 |
| 2017/0268430 A1* | 9/2017 | Schwarz | F02C 9/18 |
| 2017/0268431 A1* | 9/2017 | Schwarz | B64D 13/06 |
| 2017/0327235 A1* | 11/2017 | Feulner | B64D 13/08 |
| 2017/0335715 A1* | 11/2017 | Youssef | B64D 15/04 |
| 2018/0038280 A1* | 2/2018 | Rogero | F02C 7/14 |
| 2018/0045116 A1* | 2/2018 | Schenk | F02C 3/04 |

FOREIGN PATENT DOCUMENTS

| | | |
|---|---|---|
| EP | 1 479 889 A2 | 11/2004 |
| EP | 2 508 426 A1 | 10/2012 |
| EP | 2 546 147 A1 | 1/2013 |
| EP | 2 615 276 A2 | 7/2013 |

* cited by examiner

DE-ICING AND CONDITIONING DEVICE FOR AN AIRCRAFT

CROSS-REFERENCE TO RELATED APPLICATIONS

This application is a continuation of International Application No. PCT/FR2014/051650, filed on Jun. 27, 2014, which claims the benefit of FR 13/56304, filed on Jun. 28, 2013. The disclosures of the above applications are incorporated herein by reference.

FIELD

The present disclosure relates to an aircraft turbojet engine nacelles and more particularly concerns the de-icing of turbojet engine nacelles.

BACKGROUND

The statements in this section merely provide background information related to the present disclosure and may not constitute prior art.

An aircraft is powered by one or more propulsive assembly each comprising a turbojet engine housed in a tubular nacelle. Each propulsive assembly is fastened to the aircraft by a pylon generally located under or on an airfoil or at the fuselage.

"Upstream" means what comes before a considered point or element, in the direction of the air flow in a turbojet engine, and "downstream" means what comes after the considered point or element, in the direction of the air flow in the turbojet engine.

A nacelle generally has a structure comprising an air intake upstream of the turbojet engine, a mid-section intended to surround a fan or the compressors of the turbojet engine and its casing, a downstream section able to house thrust reversal means and intended to surround the gas generator of the turbojet engine, and is generally ended by an ejection nozzle whose outlet is located downstream of the turbojet engine.

Conventionally, the space comprised between the nacelle and the turbojet engine is called secondary flow path.

Generally, the turbojet engine comprises a set of blades (compressor and optionally a fan or non-streamlined propeller) rotationally driven by a gas generator through a set of transmission means.

A lubricant distribution system is provided to provide a good lubrication of the transmission means and of any other accessories such as electrical generators, and to cool them.

During the flight, depending on the temperature and humidity conditions, ice may be formed on the nacelle, particularly at the external surface of the air intake lip equipping the air intake section.

The presence of ice or rime changes the aerodynamic properties of the air intake and disturbs the air conveying towards the fan. In addition, the rime formation on the air intake of the nacelle and the ice ingestion by the engine in case of detachment of ice blocks can damage the engine or the airfoil, and present a risk to the safety of the flight.

A solution to de-ice the external surface of the nacelle consists in preventing the formation of ice on this external surface while keeping the concerned surface at a sufficient temperature.

Thus, the lubricant heat can be used to heat the external surfaces of the nacelle, the lubricant being thereby cooled and able to be reused in the lubrication circuit.

Documents U.S. Pat. No. 4,782,658 and EP 1479889 particularly, describe the implementation of such de-icing systems using the engine lubricant heat.

More particularly, Document U.S. Pat. No. 4,782,658 describes a de-icing system using outside air bled by a scoop and heated through an air/oil exchanger to serve the de-icing. Such system allows a better control of exchanged heat energy, but the presence of scoops in the external surface of the nacelle results in a loss of aerodynamic performances.

Document EP1479889 describes, meanwhile a system for de-icing an air intake structure of a turbojet engine nacelle using an air/oil exchanger in a closed circuit, the heated inside air of the air intake structure being put into forced circulation by a fan.

It should be noted that the air intake structure is hollow and forms a closed chamber for the circulation of de-icing air heated by the exchanger disposed within this chamber.

Thus, the heat energy available for the de-icing depends on the lubricant temperature.

In addition, the exchange surface of the air intake structure is stationary and limited and the actually dissipated energy depends mainly on the heat required for the de-icing and then on the outer conditions.

It follows that the cooling of the lubricant, as well as the temperature at which the air intake is kept, are difficult to control.

There is another solution in which are associated a heat exchanger and conduits for the circulation of a fluid to be heated so as to form a plurality of loops for the recirculation of the fluid to be heated through the exchanger, and such that a circulation area of the fluid to be heated is in contact with an external wall so as to enable a heat exchange by conduction with the outside air in the nacelle. The circulation of the fluid to be heated is performed by forced circulation.

There are solutions to de-ice the turbojet engine nacelles by means of hot air bleeding. These solutions conventionally rely on a hot air bleeding in the compressor of the turbojet engine. This bled hot air is under high pressure and high temperature, for one hand it is fed directly into an air intake lip of a nacelle to be de-iced, for the other hand it is led to an air/air exchanger (i.e., precooler) where it is cooled by the outside air to be used for the cabin air conditioning and the de-icing of the aircraft airfoil.

It has been noticed that systems as previously presented for de-icing the air intake lip by cooling of the lubricant cause friction losses in the secondary flow path due to the presence of the exchanger, and engine thrust losses when an air bleeding is performed in the secondary flow path where these losses have a significant impact on consumption (they represent about 0.5% of the total consumption), but also that such systems have a poor efficiency when the turbojet engine runs at idle and/or at low power (for example during the taxiing phase of the aircraft or when the aircraft is descending) in the case where the cooling of the engine oil involves a bleeding of the air coming from outside of the nacelle.

Solutions consisting of de-icing the air intake lip by bleeding the hot air in the compressor have drawbacks particularly in that the high temperature of the bleed air in the compressor of the turbojet engine leads to the use of costly materials for the front bulkhead of the air intake to be de-iced and for the inlet piping with commonly more than a wall to reduce the risks of bursting, and that they implement a specific air bleeding on the high-pressure compressor which reduces the power or the available thrust of the turbojet engine. Indeed, the solutions for de-icing by hot air bleeding in the compressor of the turbojet engine presented hereinabove implement conventionally three air bleedings in the compressor including one dedicated for the de-icing of the air intake lip of the nacelle.

SUMMARY

The present disclosure provides a de-icing device for an air intake lip of an aircraft nacelle, said device comprising a pre-exchanger, a fan bleeding means able to bleed low-pressure air downstream of the fan, two means for bleeding high-pressure air downstream of different stages of the compressor as well as controlled valves and check valves installed in an air circulation network wherein the pre-exchanger comprises a low-pressure air outlet able to open into the air intake lip of the aircraft nacelle via a piping of the air circulation network.

According to other features of the present disclosure, the de-icing device includes one or more of the following features considered alone or according to all possible combinations:
- the de-icing device comprises a discharge valve of a high-pressure air circulating through the pre-exchanger;
- the de-icing device comprises a mixing valve of at least a part of the high-pressure air for the cabin conditioning and the airfoil de-icing with the low-pressure air for the air intake lip de-icing;
- the de-icing device comprises a detector of the air intake lip temperature;

The present disclosure also concerns a nacelle having a de-icing device according to the present disclosure and a forced opening means for each controlled valve implemented in the de-icing device according to the present disclosure.

The present disclosure also concerns an aircraft having a nacelle according to the present disclosure.

This solution enables removing the air bleeding from the compressor dedicated to the de-icing of the air intake lip of the aircraft nacelle and directly connected to the lip, but also reducing the temperature of the air intake lip de-icing air such that less costly or lighter materials may be used to manufacture the front bulkhead of the lip, such as for example aluminum or some composite materials instead of titanium often up to then used.

Furthermore, this solution may have no influence neither on the provision of the aircraft nor on the reliability of the latter, the same number of valves being present particularly, and may have no air bleeding valve downstream of the dedicated compressor unlike a conventional nacelle design.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
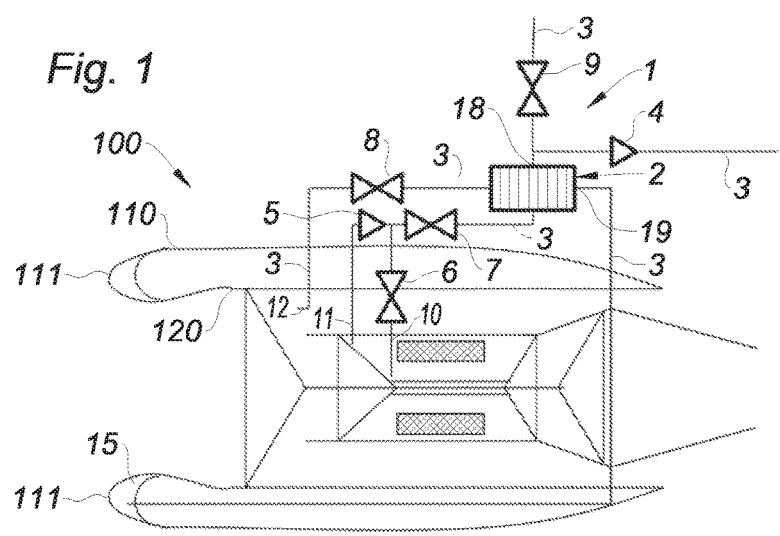
FIG. 1 is a schematic view of a first air circulation network according to a first form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all the forms described hereinafter, and in the interest of simplification, the pipings connecting the different elements of the air circulation network are each called «piping 3».

In all the forms described hereinafter, the term «passing through the network» means passing through all or part of a network, the term «controlled valve» means a valve acting as a valve cock, an actuator or not.

Referring to FIG. 1, it is described the first air circulation network 1 according to the first form of the present disclosure.

The first network 1 is comprised in an aircraft nacelle 100.

The nacelle 100 comprises an external aerodynamic wall 110 comprising an upstream air intake lip 111, an internal aerodynamic wall 120, the air intake lip 111 connecting upstream both the external 110 and the internal 120 aerodynamic walls.

The first air circulation network 1 for the high-pressure air cooling comprises a heat pre-exchanger.

The first network 1 comprises check valves allowing the air flow only in one direction (respectively 4, 5), controlled valves (respectively 6, 7, 8, 9), and the pipings 3. The valves 4, 5, 6, 7, 8, 9 are used to control the air circulation in the first network 1.

The first network 1 comprises two different orifices for high-pressure air bleeding in two different stages of the compressor 10 and 11 intended to supply high-pressure hot air to the first network 1, as well as an orifice 12 for the low-pressure air bleeding downstream of the fan intended to supply the low-pressure cold air to the first network 1.

In operation of the first network 1, the high-pressure hot air enters through the high-pressure air bleeding orifices downstream of the compressor stages 10 and 11, and the low-pressure cold air enters through the low-pressure air bleeding orifice 12 downstream of the fan.

The intake flow rates of the high-pressure hot air and of the low-pressure cold air in the first network 1 are set by means of the controlled valves 6, 7, 8 depending on the requirement.

The high-pressure hot air thus enters the first network 1 via the two air bleeding orifices 10, 11 downstream of the compressor. The pipings 3 connecting the orifices 10, 11 meet upstream of the pre-exchanger 2.

The high-pressure hot air enters through the orifice 11 of the high-pressure air bleeding downstream of the stage where the bleeding of the compressor occurs in the piping 3 of the first network 1. This air then passes through the check valve 5 of the first network 1, the piping 3, the controlled valve 7 and then the pre-exchanger 2.

Simultaneously, the high-pressure hot air also enters through the air bleeding orifice 10 downstream of another stage further downstream of the compressor in the piping 3 of the first network 1. This air then passes through the controlled valve 6 of the first network 1, the piping 3, then through the controlled valve 7 and finally through the pre-exchanger 2.

Depending on the required pressure for the cabin air conditioning, the valve 6 may be open or closed.

When the valve 6 is closed, the air circulates from the orifice 11 towards the pre-exchanger 2 via check valve 5.

When the valve 6 is open, the bled air pressure via the orifice 10 being higher than the bled air pressure via the orifice 11 the check valve 5 is closed and the air thus circulates from the orifice 10 towards the pre-exchanger 2.

Simultaneously, the low-pressure cold air enters through the low-pressure air bleeding orifice 12 downstream of the fan in the piping 3 of the first network 1. This low-pressure air then passes through the controlled valve 8 of the first network 1, the piping 3, and then enters the pre-exchanger 2. The opening of the controlled valve 8 of the fan bleeding is driven in order to keep a suitable temperature of the conditioning air.

The pre-exchanger 2 is a pre-exchanger chosen from all those known to those skilled in the art and it is, of course, adapted to its accurate use in the nacelle of a turbojet engine and its operation is known.

The pre-exchanger 2 has at least two outlets, one of the high-pressure air 18 and the other of the low-pressure air 19 to which are connected outlet pipings 3.

Once the air entered the pre-exchanger 2, it exits therefrom through the outlet piping 3.

The low-pressure 19 outlet piping 3 of the pre-exchanger 2 allows conveying the low-pressure air circulating therein directly towards the air intake lip 111 in order to the de-ice it if necessary.

The air intake lip 111 may also comprise an over-temperature detector 15 which can be used to block supplying the high-pressure air from the compressor of the aircraft turbojet engine in case of failure of a regulation member such as the fan bleeding controlled valve 8.

The high-pressure 18 outlet piping 3 then splits so as one of the resulting pipings 3 allows a part of the high-pressure air to circulate towards the nacelle outlet to be then ejected after passing through the controlled valve 9, also called discharge valve 9, allowing to regulate the discharge flow rate of the high-pressure air coming from the pre-exchanger 2, this controlled valve 9 being used only during the phases when the de-icing of the air intake lip 111 is active; the other of the resulting pipings 3 allows the other part of the high-pressure air to circulate towards a conditioning unit (not shown) of the air of a cabin of the aircraft comprising the nacelle 100 and a de-icing unit of an aircraft airfoil after passing through the check valve 4, used to prevent air from circulating from the air-conditioning circuit towards the engine in case of failure thereof. A conventional firewall-type valve controlled from the cockpit of an aircraft can also be used (it will be controlled in the closed position in case of failure or an engine fire).

When the de-icing is not active, the discharge valve 9 is kept closed, the pressure in the air conditioning circuit is regulated by the valves 6 and 7, and the temperature is regulated by varying the low-pressure air flow rate in the pre-exchanger 2 via the valve 8. The temperature and the air flow rate sent in the lip are a consequence of the setting of the preceding valves.

When the de-icing is necessary, the regulation mode of the valves changes. The de-icing air flow rate is regulated by the low-pressure valve 8. The de-icing air temperature is regulated by the high-pressure air flow rate in the pre-exchanger by the valves 6 and 7. The pressure in the air conditioning circuit is set by the discharge valve 9.

Figure 2:
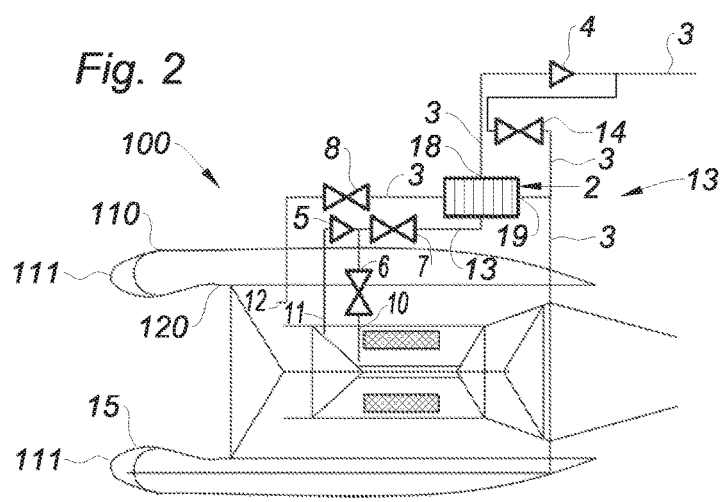
FIG. 2 is a schematic view of the a second air circulation network according to a second form of the present disclosure.

With reference to FIG. 2, it is described the second air circulation network 13 according to the second form of the present disclosure.

This second network 13 is similar to the first network 1 for all that concerns the air circulation network upstream of the pre-exchanger 2.

The pre-exchanger 2 may also include a high-pressure outlet 18 and a low-pressure outlet 19 to which two outlet pipings 3 are connected.

However, none of these outlet pipings 3 splits, thus it may only remain the outlet piping 3 allowing directly conveying the low-pressure air from the pre-exchanger 2 towards the air intake lip 111 for its possible de-icing, and the high-pressure outlet piping 3 allows conveying the air from the pre-exchanger 2 to the conditioning and de-icing unit of the aircraft airfoil by passing through the check valve 4.

The second network 13 also may have a controlled valve 14 installed in a piping 3 connecting the high-pressure 18 outlet piping 3 of the check valve 4 and the low-pressure 19 outlet piping 3 of the pre-exchanger 2. This controlled valve 14 is a mixing valve allowing mixing the air circulating through the two outlet pipings 3 from the pre-exchanger 2. This controlled mixing valve 14 allows eliminating the splitting of the outlet piping 3 which had split in the first network 1 as well as the high-pressure air ejection outside of the nacelle 100.

The mixing controlled valve 14 is driven so as to keep the desired temperature in the de-icing system.

In the same manner as shown in FIG. 1, the air intake lip 111 may comprise an over-temperature detector 15 whose operation is similar to that explained in the description of FIG. 1.

The operation of the second network 13 upstream of the pre-exchanger 2 is similar to that of the first network 1 illustrated in FIG. 1.

Figure 3:
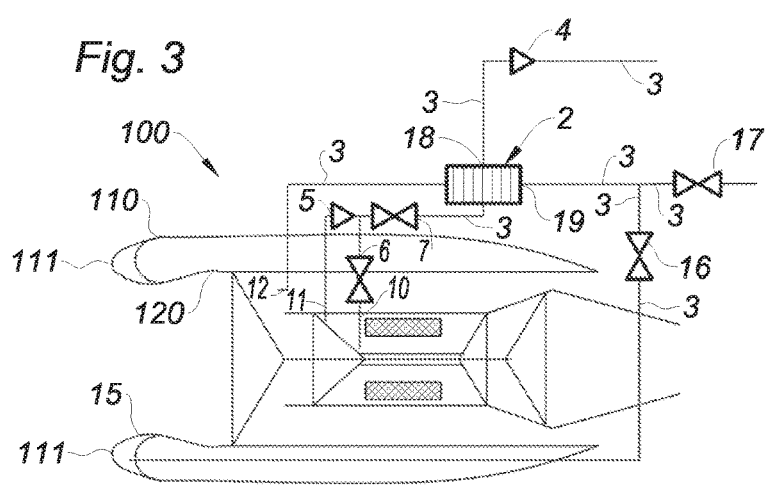
FIG. 3 is a schematic view of a third air circulation network according to a third form of the present disclosure.

The third network 13 shown in FIG. 3 is similar to the first, with the difference that the discharge valve 9 and the valve 8 are removed. The low-pressure air at the low-pressure outlet 19 of the pre-exchanger 2 is diverted towards a valve 17 allowing its ejection outwards of the nacelle 100 and towards the lip 111 by means of a controlled valve 16 when the de-icing is active.

The valve 16 controls the de-icing low-pressure air flow rate. The air temperature towards the aircraft air conditioning circuit is set by adjusting the flow rate through the valve 17.

When the de-icing is not active, the outlet valve 17 regulates the low-pressure air flow rate as in the first network and the valve 16 is closed.

In case of failures, the device according to the present disclosure allows, in some cases, to overcome some undesirable consequences.

For example when the controlled valve 7, present on the network and which allows regulating the high-pressure hot air bleeding in the turbojet engine, fails and remains blocked in the open position or is forced in the open position, then the controlled discharge valve 9 allows regulating the pressure in the first air circulation network 1.

When it is the controlled valve 9 which fails so that it remains blocked in the open position or it is forced in the open position, the de-icing of the nacelle cannot be enabled only for some flight cases, it is the controlled valve 7 of hot bleeding air regulation which is then used to regulate the temperature of de-icing of the nacelle while the air conditioning for the cabin of the aircraft and the airfoil de-icing are made with another engine.

When it is the controlled valve 8 of the fan bleeding which is blocked in the open position or forced in the open position, the regulation of the nacelle de-icing temperature is achieved with the controlled discharge valve 9 to avoid losing the air conditioning and the ability of de-icing the nacelle.

While the present disclosure has been described with particular forms, it is obvious that it is by no means limited and that it comprises all technical equivalents of described means as well as their combinations if the latter fall in the scope of the present disclosure.

What is claimed is:

1. A device for de-icing an air intake lip of an aircraft nacelle of an aircraft turbojet engine, said device comprising:
   an air circulation network comprising:
      piping;
      a pre-exchanger comprising a low-pressure air outlet configured to open into the air intake lip of the aircraft nacelle via the piping;
      a bleeding orifice configured to bleed a low-pressure air downstream of a fan of the aircraft turbojet engine into the air circulation network; and
      two orifices for bleeding a high-pressure air downstream of a compressor of the aircraft turbojet engine into the air circulation network as well as; and
      controlled valves and check valves to control air circulation in the air circulation network.

2. The de-icing device according to claim 1, further comprising a discharge valve configured to discharge a high-pressure air circulating through the pre-exchanger.

3. The de-icing device according to claim 1, further comprising a valve configured to mix at least a part of the high-pressure air for a cabin conditioning and for an airfoil de-icing, with the low-pressure air for the air intake lip de-icing at the low-pressure air outlet of the pre-exchanger.

4. The de-icing device according to claim 1, further comprising a valve between the low-pressure air outlet of the pre-exchanger and the air intake lip.

5. The de-icing device according to claim 1, further comprising a valve between the low-pressure air outlet of the pre-exchanger and an outside of the aircraft nacelle.

6. The de-icing device according to claim 1, further comprising a detector of a temperature of the air intake lip, the detector configured to disable the de-icing of the air intake lip in case of overheat of the air intake lip.

7. A nacelle comprising the device for de-icing the air intake lip according to claim 1.

8. The nacelle according to claim 7, further comprising a forced opening means for each controlled valve.

9. An aircraft comprising the nacelle according to claim 7.

* * * * *